United States Patent [19]
Woods et al.

[11] Patent Number: 6,101,566
[45] Date of Patent: Aug. 8, 2000

[54] COMPUTER SYSTEM WITH BRIDGE LOGIC THAT INCLUDES AN INTERNAL MODULAR EXPANSION BUS AND A COMMON TARGET INTERFACE FOR INTERNAL TARGET DEVICES

[75] Inventors: Robert Woods, Tomball; Jeff W. Wolford; Jeffrey C. Stevens, both of Spring; Shaun Wandler, Tomball; Todd Deschepper, Spring; Jeffrey T. Wilson, Houston, all of Tex.; Danny Higby, San Diego, Calif.; Russ Wunderlich, Townwater, Wash.

[73] Assignee: Compaq Computer Corporation, Houston, Tex.

[21] Appl. No.: 09/041,606

[22] Filed: Mar. 13, 1998

[51] Int. Cl.[7] .................................................. G06F 13/14
[52] U.S. Cl. ............................................ 710/129; 710/101
[58] Field of Search ................................... 710/126, 129, 710/128

[56] References Cited

U.S. PATENT DOCUMENTS

| | | | |
|---|---|---|---|
| 5,634,073 | 5/1997 | Collins et al. | |
| 5,854,910 | 12/1998 | Gulick | 710/129 |
| 5,926,629 | 7/1999 | Gulick | 710/107 |
| 5,935,226 | 8/1999 | Klein | 710/129 |
| 5,974,239 | 10/1999 | Klein | 710/129 |

OTHER PUBLICATIONS

VLSI Digital Signal Processors by Vijay K. Madisetti (Georgia Institute of Technology) Chapter 3, pp 61–63; Butterworth–Heinemann.

*Primary Examiner*—Glenn A. Auve
*Attorney, Agent, or Firm*—Conley, Rose & Tayon, P.C.; Michael F. Heim; Daniel J. Krueger

[57] ABSTRACT

A computer system includes a CPU and a memory device coupled by a North bridge logic unit to an expansion bus, such as a PCI bus. A South bridge logic connects to the expansion bus and couples various secondary busses and peripheral devices to the expansion bus. The South bridge logic includes internal control devices that are targets for masters on the expansion bus. The target devices couple to the expansion bus through a common expansion target interface, which monitors and translates master cycles on the expansion bus on behalf of the target devices. The South bridge also includes an internal modular target expansion bus coupling the internal target devices to the common target interface. The internal modular target expansion bus permits the target devices to receive master cycles from any expansion bus by understanding a standardized group of signals represented by the internal modular target expansion (IMAX) bus. The target interface then is responsible for understanding the protocol of the expansion bus and converting the expansion bus signals to IMAX target bus signals. The IMAX target bus includes both an inbound bus and an outbound data bus for driving out data requested as part of a read cycle to an internal target device.

37 Claims, 8 Drawing Sheets

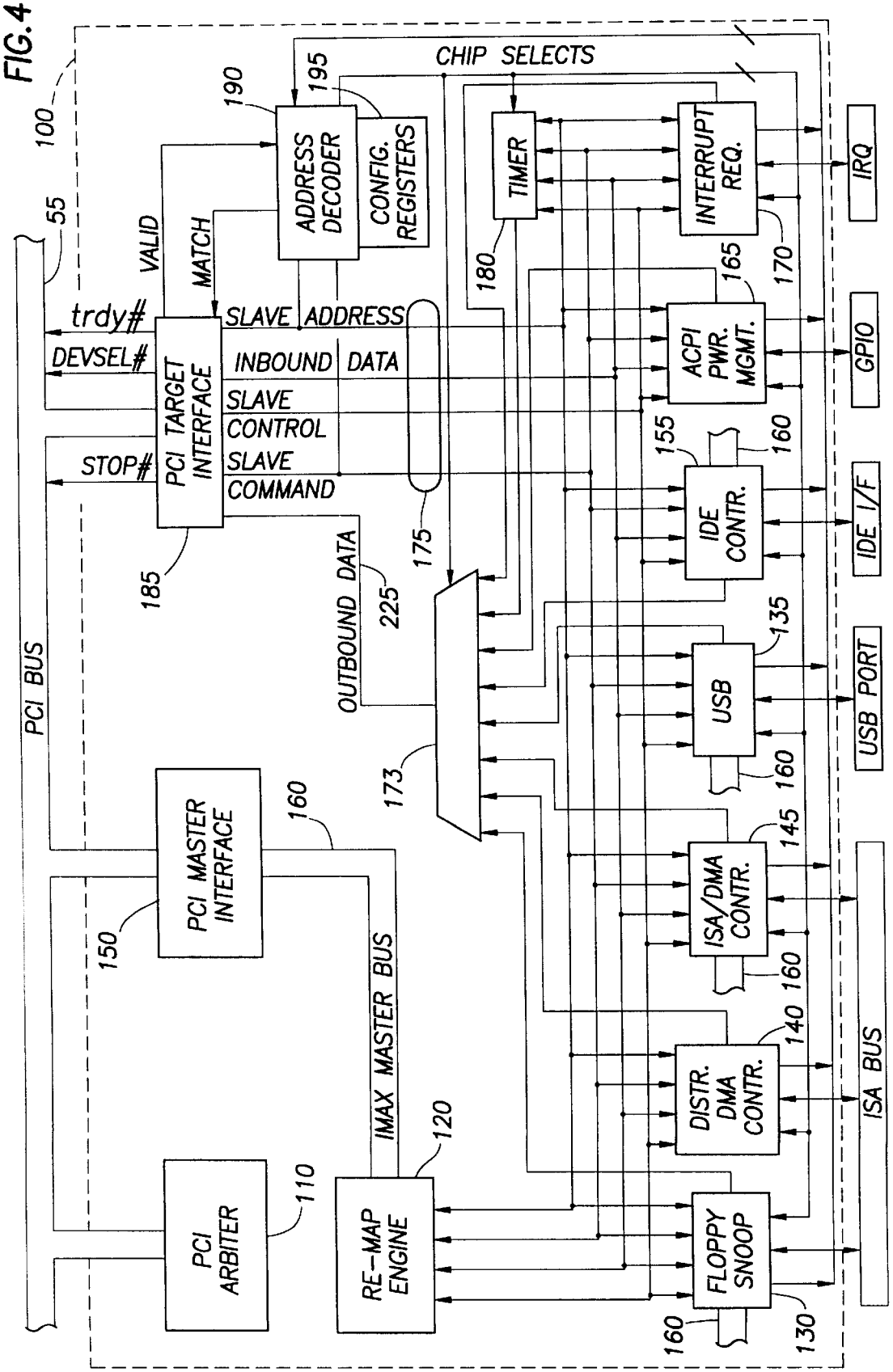

COMPUTER SYSTEM WITH BRIDGE LOGIC THAT INCLUDES AN INTERNAL MODULAR EXPANSION BUS AND A COMMON TARGET INTERFACE FOR INTERNAL TARGET DEVICES

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to computer systems. More particularly, the present invention relates to circuitry that forms a communications "bridge" between components in a personal computer system. Still more particularly, the present invention relates to a bridge logic device that includes an internal modular target expansion bus for facilitating the transfer of data between an internal target and an external master device that operates according to a protocol different than the internal modular expansion bus.

2. Background of the Invention

A personal computer system includes a number of components with specialized functions that cooperatively interact to produce the many effects available in modern computer systems. The ability of these various components to exchange data and other signals is vital to the successful operation of a computer system. One of the critical requirements in designing a new computer system is that all system components (including those that may be added to the system by a user) must be compatible. A component is compatible if it effectively communicates and transfers data without interfering or contending with the operation of other system components. Because modem computer systems are designed with components that operate with different protocols, the likelihood that components may not properly communicate is heightened. Compatibility between devices with different protocols is achieved, at least in part, with bridge logic devices. As the name implies, bridge logic devices provide a communications "bridge" between components and busses operating according to different protocols. The present invention is directed to an improved bridge logic device.

Computer systems have components with different protocols because of the manner in which computers evolved, and the desire to make new computer designs backwards-compatible with prior designs. This backward compatibility insures that the user can use a peripheral device from a prior computer in a new computer system. Early computer systems had relatively few components. As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Typically, the CPU controls most of the activities of the computer system. The CPU supervises data flow and is responsible for most of the high-level data modification in the computer. The CPU, therefore, is the "heart" of the system and receives signals from the peripheral devices, reads and writes data to memory, processes data, and generates signals controlling the peripheral devices.

Despite the importance of the processor, the performance of the computer system is determined only in part by the speed and efficiency of the processor. Other factors also affect system performance. One of the most critical factors is the bus that interconnects the various system components. The size and clock speed of the bus dictate the maximum amount of data that can be transmitted between components. One early bus that still is in use today is the ISA (Industry Standard Architecture) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

Since the introduction of the ISA bus, computer technology has continued to evolve at a relatively rapid pace. New peripheral devices have been developed, and both processor speeds and the size of memory arrays have increased dramatically. In conjunction with these advances, designers have sought to increase the ability of the system bus to transfer more data at a faster speed. One way in which the system bus has been made more effective is to permit data to be exchanged in a computer system without the assistance of the CPU. To implement this design, however, a new bus protocol had to be developed. One such bus that permits peripheral devices to run master cycles independently of the CPU is the EISA (Extended Industry Standard Architecture) bus. The EISA bus enables various system components residing on the EISA bus to obtain mastership of the bus and to run cycles on the bus. Another bus that has become increasingly popular is the Peripheral Component Interconnect (PCI) bus. Like the EISA bus, the PCI bus has bus master capabilities. The PCI bus also operates at clock speeds of 33 MHz or faster. Current designs contemplate implementing a 100 MHz PCI bus.

Because of the bus mastering capabilities and other advantages of the PCI (and EISA) bus, many computer manufacturers now implement one or the other of these busses as the main system bus in the computer system. Because of the proliferation of devices that had been developed for the ISA bus, the computer manufacturers also continued to provide an ISA bus in the computer system to permit the use of the many peripheral devices that operated under that protocol. To further provide flexibility, some computer manufacturers provide all three busses in the same computer system to permit users to connect peripheral devices of all three protocols to the computer system. To implement these various busses in the same computer system, special bridge logic circuit has been developed to interface to the various busses.

FIG. 1 shows a representative prior art computer system that includes a CPU coupled to a bridge logic device via a CPU bus. The bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). Various components that understand PCI protocol may reside on the PCI bus, such as a graphics controller.

If other secondary expansion busses are provided in the computer system, another bridge logic device typically is used to couple the PCI bus to that expansion bus. This bridge logic is sometimes referred to as a "South bridge" reflecting its location vis-a-vis the North bridge in a typical computer system drawing. An example of such bridge logic is described in U.S. Pat. No. 5,634,073, assigned to Compaq Computer Corporation. In FIG. 1, the South bridge couples the PCI bus to an ISA bus. Various ISA-compatible devices are shown coupled to the ISA bus.

As one skilled in the art will understand, devices residing on the ISA bus may be targets for devices coupled to the PCI bus, including the CPU. Thus, even though the CPU is not directly connected to the ISA bus, it may still need to read and write data, or perform other operations, to devices on that bus. The PCI protocol permits devices residing on the PCI to run master cycles to targets residing on the PCI bus. To permit devices on other busses to run master cycles on the PCI bus to the secondary expansion busses such as the ISA bus, an interface controller for secondary expansion busses and other peripheral devices coupled to the South bridge must be included in the South bridge logic. This interface controller converts the PCI signals to ISA signals for target cycles to the South bridge. Thus, the interface controller for the ISA bus must understand the protocol of both busses. As an example, if the designer wanted to permit the CPU or some other PCI peripheral to run master cycles on the PCI bus to the hard drive, then a hard drive interface controller would be provided in the South bridge logic that was capable of receiving signals from the PCI bus and translating the PCI signals to IDE signals. If the hard drive also could be a PCI master, the hard drive controller in the South bridge also had to be capable of driving PCI master cycles. Similarly, if the modem could also function as a PCI target and master, then an associated controller must also be provided in the South bridge logic to receive and process PCI signals from PCI masters, and also to assert master signals on the PCI bus.

One of the problems with previous South bridges is that the controllers translated signals from one protocol of an external bus to a non-standard protocol internal to the bridge that often varied from controller to controller. Such South bridges were then forced to include complicated, extensive logic to interface to each of the internal controllers. In addition, every time that another expansion bus peripheral was added, the PCI controller for the South bridge logic must be extensively re-designed to interface to the new peripheral. Similarly, every time that the expansion bus changes or is replaced with a different design, each interface controller must be re-designed to be made compatible with the new expansion bus protocol. To date, no one has developed a bridge logic device that overcomes these deficiencies.

SUMMARY OF THE INVENTION

The present invention includes a bridge logic device that overcomes the problems described above by providing a common expansion bus target interface that functions as an interface for all controllers residing in the bridge logic. As a result, the controllers in the bridge logic do not need to understand the protocol of the expansion bus. The target interface receives signals from masters on the expansion bus and translates those signals to a standard protocol understood by all targets in the bridge logic device. The interface controllers in the bridge logic couple to the target interface through a set of standardized address, data and control lines referred to herein as the IMAX (Internal Modular ASIC EXpansion) target bus. By using a standardized target bus within the bridge logic, peripheral devices can be designed to readily interface with the bridge logic. In addition, if the protocol of the expansion bus changes, or if the expansion bus itself changes, only the target interface needs to be modified in the bridge logic. The use of the modular internal bus and design eliminates the necessity of changing all of the control devices within the bridge logic to conform to a change in the expansion bridge.

In the preferred embodiment, a South bridge logic device is disclosed that includes a common PCI target interface. The PCI target interface couples to each of the interface controllers within the South bridge logic, such as the USB controller, the DMA controller, and the IDE controller, among others. The PCI target interface preferably couples to these internal interface controllers via an internal modular target expansion bus. The PCI target interface receives address, data and control signals via the modular expansion bus, without the necessity of a multitude of sideband signals. The PCI target interface functions to translate signals from PCI masters to the internal modular bus protocol.

According to another aspect of the present invention, a South bridge logic device includes an internal modular expansion bus comprised of separate master and target busses. The target internal modular expansion bus preferably connects to a target interface for coupling the internal expansion bus to an external expansion bus. The target interface functions as a common interface to the external expansion bus for all interface controllers in the South bridge that can receive master cycles from the external expansion bus. In the preferred embodiment, the external expansion bus is the PCI bus, but the target interface could be readily adapted to operate with other expansion busses, and may even be modified to operate with a plurality of expansion busses. In fact, one of the purposes of the present invention is to permit the South bridge to be easily modified to make it compatible with new bus technologies by simply modifying the devices that directly interface to the expansion bus, such as the target interface.

According to the preferred embodiment, the South bridge includes an internal modular target expansion bus that couples to the target interface. As a result, all cycle requests from the PCI bus (or other expansion bus) are routed through the target interface in the South bridge. Preferably, the target interface couples to an address decoder to determine which of the interface controllers within the South bridge is the target of a PCI cycle to the South bridge. The target interface then runs a cycle on the internal modular target expansion bus to the intended interface controller. In accordance with the preferred embodiment, the South bridge also includes a separate outbound target data bus on which read data is returned from targets within the South bridge.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 4 is a schematic block diagram of the bridge logic device of FIG. 2 constructed in accordance with the preferred embodiment;

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF A PREFERRED EMBODIMENT

Figure 1:
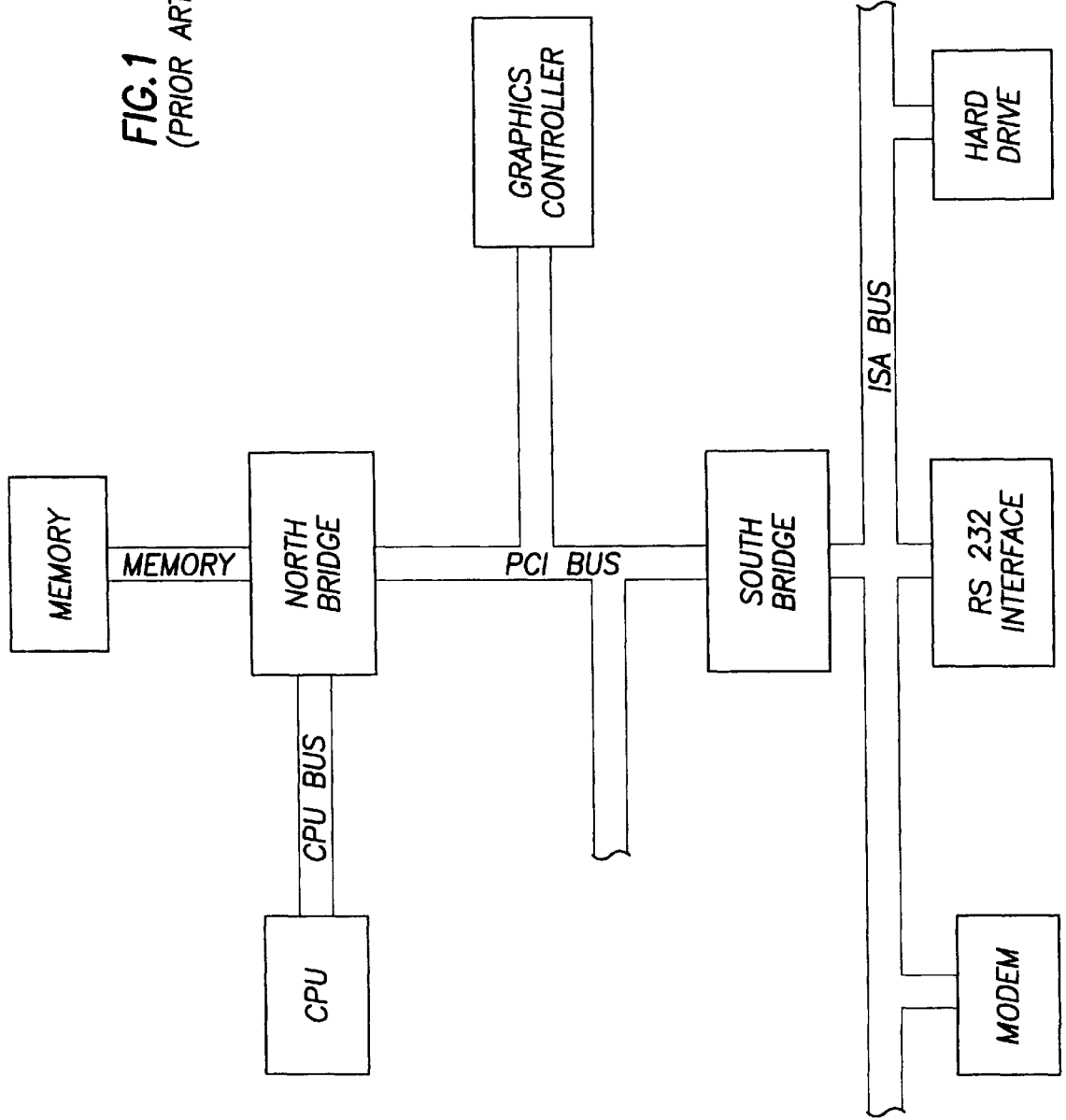
FIG. 1 is a block diagram of a prior art computer system implementing a bridge logic to couple together dissimilar busses.
Figure 2:
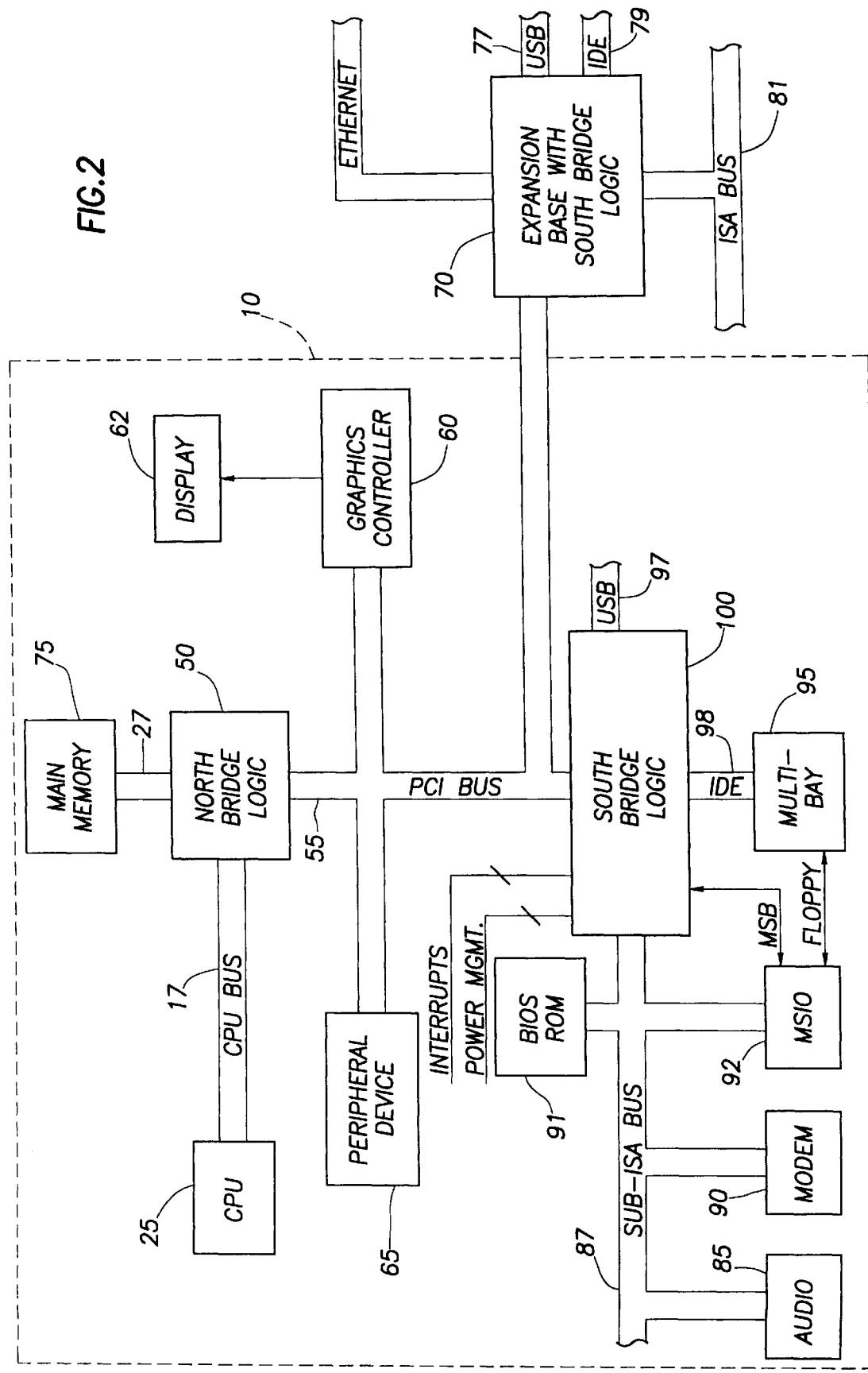
FIG. 2 is a block diagram of a portable computer system constructed in accordance with the preferred embodiment of the present invention with an improved bridge logic device.

Referring now to FIG. 2, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge." The CPU preferably couples to bridge logic 50 via a CPU bus 17, or the bridge logic 50 may be integrated into the CPU 25. The CPU 25 may comprise, for example, a Pentium® II Microprocessor. It should be understood, however, that other alternative types of microprocessors could be employed. Further, an embodiment of computer system 10 may include multiple processors, with each processor coupled through the CPU bus 17 to the bridge logic unit 50.

The main memory array 75 preferably couples to the bridge logic unit 50 through a memory bus 27, and the bridge logic 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 2. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into and out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (100 MHz or faster) PCI bus. In the preferred embodiment, a plurality of PCI peripheral devices may reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 2, it should be recognized that computer system 10 may include any number of PCI devices as desired.

The following discussion describes the preferred embodiment of computer system 10 for a laptop computer that can be connected to an expansion base 70 via the PCI bus 55. This should not be construed as limiting the present invention to a laptop. The present invention also may be used with a desktop system, work station, server, or handheld computer. In addition and as mentioned above, computer system 10 can be implemented with respect to the particular bus architectures shown in FIG. 2 (i.e., PCI bus), or other bus architectures, as desired. The embodiment described herein, however, assumes bus 55 represents a PCI bus, as shown in FIG. 2, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the PCI Local Bus Specification (1993), and Intel P6 External Bus Specification. If an AGP bus also is used in the computer system, reference may be made to the Accelerated Graphics Port Interface Specification (Intel, 1996).

Referring still to FIG. 2, another bridge logic device 100 also preferably connects to expansion bus 55. This bridge logic device 100 (which sometimes is referred to a "South bridge") couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "fire wire") bus, or any of a variety of other busses that are available or may become available in the future. In the preferred embodiment of FIG. 2, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 2, an MSIO (Mobile Super I/O) chip 92 connects to the sub-ISA bus, as does an audio card 85, modem 90 and BIOS ROM 91. Similarly, according to the preferred embodiment, a multi-bay configuration couples to the IDE bus 98 and to the MSIO 92. The multi-bay configuration preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer. To facilitate use of the computer system 10 within a traditional desktop environment, an expansion base preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown =specifically) for coupling components on the PCI bus to other components coupled to the expansion base. Thus, as shown in FIG. 2, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications), if desired, for the South bridge logic within the expansion base 70. Alternatively, the present invention also may be implemented by using a prior art South bridge device in the expansion base 70.

Figure 3:
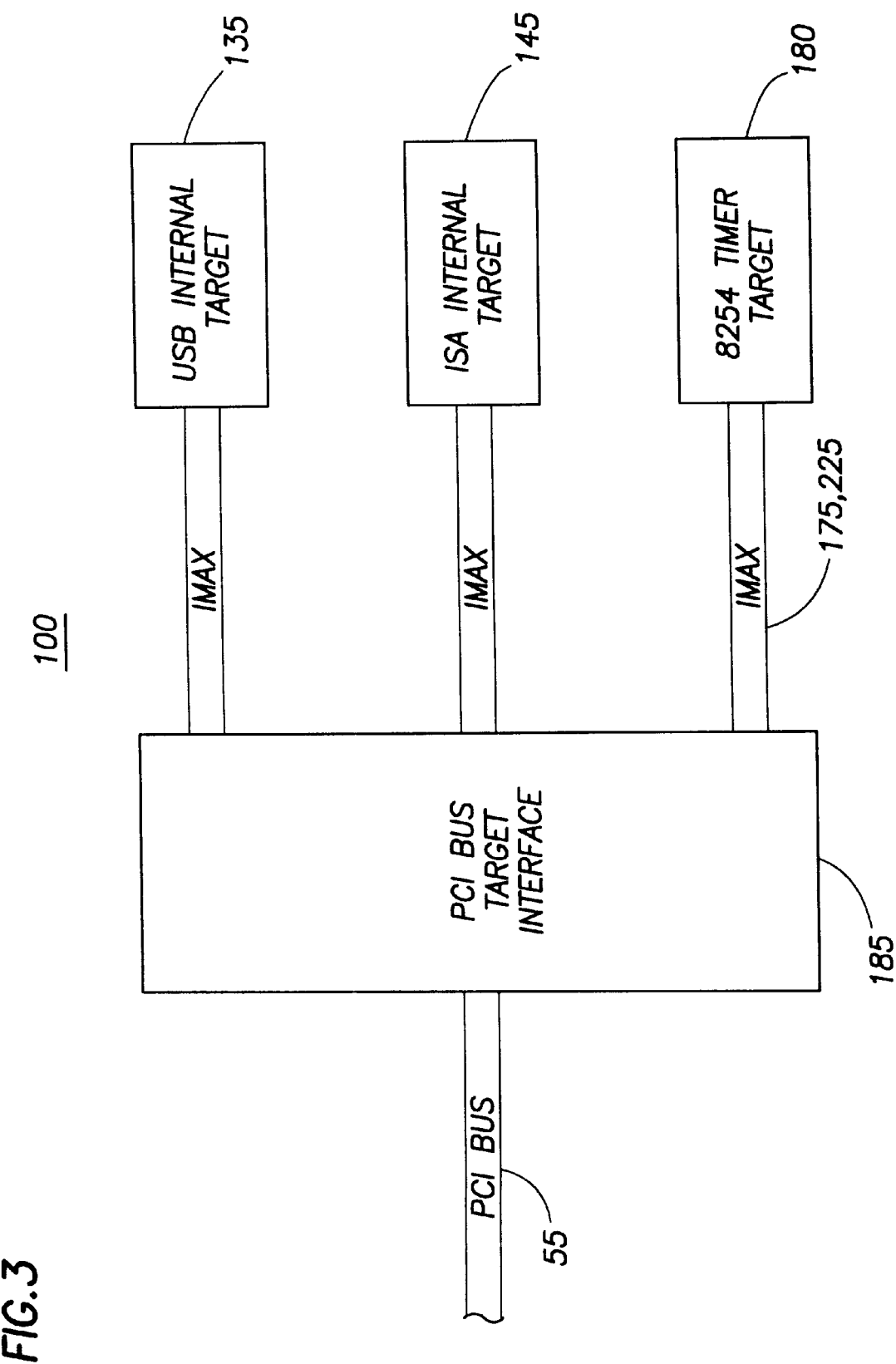
FIG. 3 is a block diagram of the improved bridge logic device of FIG. 2 that illustrates a common bus target interface.

Referring now to FIG. 3, the South bridge 100 of the present invention is depicted conceptually to illustrate certain aspects of the present invention. The South bridge shown in FIG. 3 preferably includes a PCI target interface 185 that couples South bridge devices that are the targets of cycles on the PCI bus 55, and an IMAX (Internal Modular ASIC EXpansion) inbound target bus 175 and IMAX outbound target bus 225 coupling the PCI target interface 185 to various internal target devices 135, 145, 180. Although FIG. 3 shows the South bridge 100 connecting to a PCI bus, it should be understood that expansion bus 55 may comprise any type of system bus capable of use in a computer system. Thus, for example, expansion bus 55 may comprise an IEEE standard 1394 (fire wire) bus, or any other suitable bus. Similarly, while bus target interface device 185 is shown as a PCI target interface, target interface 185 may be modified for use with other bus standards. The only requirement is that target interface 185 must be capable of detecting and claiming master cycles on the expansion bus.

The internal target devices comprise logic circuitry within the South bridge, or control interfaces within the South bridge associated with components and/or busses external to the South bridge 100. Three internal targets are shown conceptually in FIG. 3, including a USB target 135, an ISA target 145, and an 8254 timer target 180. Each of these targets is referred to in FIG. 3 as an "internal target" denoting the fact that each of these devices is capable of receiving PCI signals via the target interface 185 and the IMAX target bus 175 and of providing outbound data, when requested, on outbound data bus 225. The IMAX target bus 175 preferably includes data, address and control lines for transmitting the necessary information to the internal target to enable that device to complete the requested transaction.

Thus, the expansion bus target interface 185 couples internal target devices within the South Bridge 100 to external masters on the expansion bus 55. The implementation of a common expansion bus target 185 and internal modular target bus makes it unnecessary for the internal target devices 135, 145, 180 to understand PCI protocol (or whatever the protocol is of the expansion bus) signals. The internal targets 135, 145, 180 need only be capable of implementing a single protocol, the IMAX protocol. In contrast to prior systems in which each of the internal control devices in the bridge logic was required to understand the protocol of the expansion bus (in FIG. 3, the PCI protocol), the expansion bus target interface 185 of the present invention performs the necessary translations from the PCI protocol to the IMAX protocol. As a result, the internal IMAX target devices need not be capable of understanding and running PCI cycles since the expansion bus target interface 185 performs that function. In addition, because the interface to the internal targets is always the same, one internal target design can be used to communicate with various different expansion busses. The only requirement is that the target interface be capable of translating the various protocols to the IMAX protocol. In addition, with respect to the outbound data, the IMAX target bus is non-tristateable and is always driven. Consequently, it appears to the internal target that it is the only target talking to the expansion target interface.

Referring now to FIG. 4, the South bridge logic 100 constructed in accordance with the preferred embodiment comprises the PCI target interface 185, a PCI master interface 150, a PCI arbiter 110, a plurality of various target devices, a PCI inbound target bus 175 and outbound target bus 225 coupling a PCI target interface 185 to internal IMAX targets, and an IMAX master bus 160 coupling the internal master devices to the PCI master interface 150. The IMAX target devices integrated in the South bridge 100 preferably include a re-map engine 120, floppy snoop logic 130, USB controller 135, distributed DMA controller 140, ISA/DMA controller 145, IDE controller 155, ACPI/power management logic 165, interrupt controller 170, and internal timer 180. Except for the re-map engine 120 and internal timer 180 and floppy snoop logic 130, each of these targets functions as an interface to an external component or bus. Each of these targets couples to both the inbound IMAX target bus 175 and to the outbound IMAX target bus 225. Furthermore, the re-map engine 120, floppy snoop 130, ISA controller 145, USB controller 135 and IDE controller 155 all preferably function as IMAX masters, and thus also couple to the IMAX master bus 160, as shown in FIG. 4. For master read cycles to the expansion bus, the inbound IMAX bus 175 preferably is used as the bus providing the read data from the PCI bus to the internal IMAX master.

The PCI target interface 185 monitors PCI bus cycles and determines when a valid cycle has been run on the PCI bus. In the preferred embodiment, the PCI target interface 185 couples to an internal address decoder 190 and configuration registers 195. The configuration registers 195 are used to determine if a target is within the South bridge or whether the address is located on the IDE or USB bus. The PCI target interface 185 preferably provides an output signal (VALID) to the address decoder 190 indicating the detection of a valid PCI cycle. When the address decoder determines that a PCI address corresponds to an address internal to the South bridge, or to an address on the IDE bus or USB bus, the address decoder 190 provides a MATCH signal to the PCI target interface 185. The PCI target interface 185 also couples to the IMAX inbound target bus 175 to transmit inbound address, data, control and command signals to IMAX targets 120, 130, 135, 140, 145, 155, 165, 170, and 180. Although separate lines are used to denote slave command and slave control signals in FIG. 4, one skilled in the art will understand that both control signals and command signals may be grouped together as control signals, in accordance with normal convention. The PCI target interface 185 also couples to an IMAX outbound target bus 225 that supplies data from internal targets during PCI read cycles.

Each of the internal targets within the South bridge 100 is responsible for posting write data at the rate for which it is designed, and for supplying read data within PCI latency requirements. As will be understood by one skilled in the art, a PCI master starts a PCI cycle by asserting FRAME# on the appropriate PCI bus line. The PCI bus is a multiplexed address and data bus, and thus the address and data are transmitted on the same 32 bus lines, defined as AD[31:0]. During PCI cycles, the address is transmitted first during an "address phase," followed by the data during the "data phase." The PCI bus includes a clock line, PCICLK for synchronizing signals on the PCI bus. The first clock edge on which FRAME# is asserted defines the address phase, and the PCI address and associated bus control signals are latched on the same rising edge of the PCICLK signal. The data phase begins when the target asserts trdy# and the master asserts irdy#, indicating that both target and master are ready for the data transfer.

As one skilled in the art will understand, the PCI bus 55 is capable of transferring data between masters and targets in bursts. A master indicates a desire to perform a burst transaction by holding FRAME# asserted. In the preferred embodiment, the PCI target interface 185 supports burst cycles for various internal targets when the interface can remain PCI compliant. In the case of transactions to the ISA controller 145, for example, the PCI target interface 185 does not support burst cycles. Thus, if the PCI master holds FRAME# asserted in an attempt to burst to the ISA bus, the PCI target interface 185 accepts the first data transfer, and then terminates the cycle by asserting the stop (STOP#) signal on the PCI bus 55. The PCI target interface 185 does not accept burst cycles to the ISA bus because it takes longer than 8 PCICLK clock cycles (the PCI specification requirement) to run most cycles on the ISA bus. Thus, the latency caused by the ISA bus would make the South bridge non-PCI-compliant.

The PCI target interface asserts DEVSEL# positively or subtractively to claim a PCI transaction. When the PCI target interface 185 asserts DEVSEL#, it does not negate DEVSEL# until the transaction ends on the PCI bus 55. The end of the bus transaction is indicated by having FRAME# negated, irdy# asserted, and either trdy# or STOP# asserted. The assertion of trdy# indicates the last data transfer was accepted, whereas the assertion of STOP# indicates that the cycle was not completed and should be retried later.

With respect to the internal IMAX targets, the PCI target interface asserts various control signals to orchestrate the transfer of data between the internal targets and the masters on the PCI bus. The various IMAX signals between the PCI target interface 185 and the internal IMAX targets will be discussed in detail below.

The address decoder 190 couples to the IMAX target bus 175 and to the configuration registers 195. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting DEVSEL# on the PCI bus 55 when no other PCI device responds to a PCI cycle. These cycles then are passed by the target interface 185 to the ISA bus via the ISA controller 145. Alternatively, the South bridge device in the expansion base 70 may act as the subtractive decode agent for the PCI bus.

Referring still to FIG. 4, the address decoder 190 couples to the PCI target interface 185 through a pair of control signal lines identified herein as VALID and MATCH. The VALID signal line transmits a signal from the PCI target interface 185 indicating if the PCI signals on the slave address lines comprise valid PCI signals for decoding by address decoder 190. The MATCH signal line transmits a signal from the address decoder 190 to the target interface 185 indicating if the PCI address value matches an address located in the South bridge or on one of the secondary expansion busses coupled to the South bridge, such as the USB bus or IDE bus. The address decoder 190 also produces a number of chip select output signals that are provided to each of the internal IMAX targets and to a multiplexer 173. The chip selects identify which of the IMAX internal targets are being addressed by the external PCI master. The address decoder 190 is closely linked to a set of configuration registers 195. The configuration registers 195 preferably include an Internal I/O Positive Decode Enable Configuration Register that, among other things, indicates if the South bridge 100 is responsible for decoding I/O cycles to an internal South bridge register. In the preferred embodiment, the appropriate bit is set in this register causing the address decoder 190 to decode I/O cycles to internal South bridge devices, while the same register bit is reset in the South bridge in the expansion base 70 (FIG. 2). Thus, in the preferred embodiment, the South bridge 100 exclusively decodes cycles to unique internal I/O register addresses.

The PCI Master interface 150 executes PCI cycles on behalf of ISA bus master 145, the DMA re-map engine 120, floppy snoop logic 130, USB master 135 and IDE master 155. As a PCI master, the PCI master interface 150 runs memory and I/O read and write cycles on the PCI bus. The PCI master interface 150 also preferably runs memory read line commands when filling ISA/DMA, IDE and USB read line buffers. Thus, the PCI master interface 150 asserts standard PCI protocol signals on the PCI bus 55, including multiplexed address and data signals. The PCI master interface 150 translates IMAX master cycles from the IMAX masters to PCI cycles.

In the preferred embodiment, the PCI master interface 150 includes internal IMAX arbiter logic that arbitrates mastership of the IMAX master bus 160. Although any arbitration scheme may be used, the preferred embodiment implements a least recently used (LRU) arbitration scheme for awarding mastership of the IMAX master bus 160. Once the internal IMAX arbiter unit arbitrates mastership of the IMAX master bus, the PCI master interface 150 issues control signals selecting a particular master. Although not shown specifically in FIG. 4, each of the IMAX masters indicate a request for mastership of the IMAX master bus 160 by asserting a imReq signal to the PCI master interface 150. The PCI master interface 150 awards mastership by returning an imGnt signal to the IMAX awarded mastership. The IMAX master bus 160 couples each of the internal masters to the PCI master interface 150. Preferably, the IMAX master bus includes address, data and control lines that are common to each of the masters. Additional details regarding the common master interface for South bridge 100 may be obtained from a commonly assigned and co-pending patent application entitled, "Computer System With Bridge Logic That Includes An Internal Modular Expansion Bus And A Common Master Interface For Internal Master Devices."

The PCI arbiter 110 couples to the PCI bus 55 and receives requests from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack. Other arbitration may be used instead of the LRU algorithm if desired without departing from the principles of the present invention.

Referring still to FIG. 4, each of the target devices included in the preferred embodiment will now be briefly described. One skilled in the art will understand, however, that the present invention is not limited to the choice of targets included in the bridge logic device, and that various targets may be used as required to meet the needs and requirements of the computer system.

The IDE controller 155 operates as both a master and as a target within the South bridge 100. Thus IDE controller 155 couples to both the IMAX master bus 160 and the IMAX target busses 175 and 225. The IDE controller 155 preferably comprises a dual mode controller that couples to the IDE interface for the IDE bus. Similarly, the USB controller 135 couples to the USB port on the computer system 10. The USB controller 135 preferably operates as both a master and as a target and thus couples to both the IMAX master bus 160 and to the IMAX target busses 175 and 225.

Referring still to FIG. 4, the DMA controller in the ISA/DMA controller logic 145 preferably provides 24 bits of memory address and 16 bits of byte count for each of 7 DMA channels. The ISA/DMA controller 145 presents an 8-bit interface and thus only is programmed with 8-bit I/O instructions. The ISA/DMA controller 145 supports 8 or 16-bit DMA transfers to memory on the PCI (or other expansion) bus 55. The ISA/DMA controller 145 couples to the ISA (or sub-ISA) bus and when the DMA has control of the ISA bus, the ISA/DMA controller 145 translates the DMA commands into the appropriate bus cycles. As shown in FIG. 4, the ISA/DMA controller 145 operates as both a master and as a slave, and thus couples to both the IMAX master bus 160 and the IMAX target busses 175 and 225.

The distributed DMA controller 140 and re-map engine 120 work in conjunction to process cycles to legacy DMA addresses. The re-map engine 120 couples to both the IMAX master bus 160 and the IMAX target busses 175 and 225. The South bridge preferably implements a distributed DMA architecture that allows multiple DMA devices to exist on the PCI bus. This architecture separates the DMA controllers into individual channels, allowing them to be distributed between PCI devices. The individuals channels, however, must appear to be at a single location for programming purposes. In the preferred embodiment, the DMA architecture separates the I/O address space for each channel into 16-byte blocks. This 16-byte I/O block can then be mapped anywhere in the 64 kbyte I/O address space. The old and new I/O registers are tied together by a re-map engine 120 that distributes all legacy DMA I/O accesses to the associated PCI device on a byte per byte basis. Both South bridge 100 and the South bridge in the expansion base 70 incorporate all seven DMA channels, the re-map engine 120, and the distributed DMA channel interface.

To enable distributed DMA service, the PCI target interface 185 preferably enables the re-map engine 120 and the distributed DMA channel interface 140, and also enables and configures the addresses for the distributed DMA channels. When a PCI cycle attempts to access a legacy DMA register, the address decoder 190 positively decodes the cycle and transmits a MATCH signal to the PCI target interface 185. A chip select is given to the re-map engine, which in return, asserts the retry signal to the PCI target interface. The PCI target interface 185 then issues a retry cycle to the PCI master that initiated the cycle. The re-map engine 120 then arbitrates for mastership of the PCI bus 55 through the IMAX master bus protocol. Once the re-map engine 120 receives a mastership grant for the PCI bus, the re-map engine 120 performs cycles to the distributed DMA channels. These cycles are re-run until completed. While the re-map engine 120 is in the process of accessing the distributed channels, any access to a legacy DMA register will result in the issuance of the retry cycle by the PCI target interface 185. The distributed channel data is collected and stored in preparation for the cycle to be executed when retried by the PCI master.

When an access is made to a native DMA register that resides on this South Bridge's ISA bus, the address decoder 190 positively decodes the address. A chip select is given to the distributed DMA controller 140 interface. The address then is translated by the distributed DMA controller to a legacy DMA address and then the access is transferred to the local ISA bus. Data returned in response to the access is translated from legacy DMA to distributed DMA protocol by the distributed DMA controller 140 before being transferred to the IMAX target outbound data bus 225, and then to the PCI bus 55.

Referring now to FIGS. 2 and 4, the floppy snoop logic 130 operates as both a South bridge master and target. Thus, floppy snoop 130 couples to the IMAX master bus 160 and to the IMAX target busses 175 and 225. In addition, the floppy snoop logic 130 also couples to the floppy drive through the ISA bus as shown in FIG. 4. When a PCI write cycle is made to a floppy address that is shadowed in the expansion base 70, the PCI target interface will cause a retry cycle to be issued to the PCI master that initiated the cycle to start a delayed transaction. The floppy snoop then initiates the floppy write cycle on the PCI bus through the PCI master interface 150 to shadowed floppy registers in the expansion base 70. At the same time, the floppy snoop logic 130 also runs a write cycle to the MSIO 92 on the sub-ISA bus 87. When the external PCI master retries the write cycle, the snoop logic completes the delayed transaction.

Referring again to FIG. 4, the ACPI/power management logic 165 preferably operates as a slave or target within the South bridge 100, and couples externally to a 16 bit General Purpose I/O bus. In accordance with the preferred embodiment, the ACPI/power management logic 165 conforms to the Advanced Configuration and Power Interface Specification (ACPI). The ACPI/power management logic preferably supports five reduced power states, including Device Idle, System Idle, Global Standby, System Standby, and Hibernation. A more complete description of ACPI may be found in ACPI Design Specification (Microsoft/Intel/Toshiba). The South bridge 100 preferably provides 16 general-purpose I/O signals for various power management functions. These signals are accessed in the power management I/O indexed register space.

The interrupt controller 170 preferably controls interrupt requests from the South bridge 100 to the CPU. In the preferred embodiment, the interrupt controller includes two separate controllers, one of which is the master and one of which is the slave. The INT output of the slave controller is cascaded into the IRQ2 input of the master controller. The master controller may be programmed in the fully nested mode to permit the slave controller to send the correct interrupt vector back to the CPU identifying the source of the interrupt. In the preferred embodiment, both master and slave interrupt controllers comprise INTEL 8259 controllers. Further, according to the preferred embodiment, any outstanding PCI cycles to secondary I/O busses (such as ISA, PCMCIA, etc.) must be completed before write cycles are posted to the interrupt controller.

The internal timer 180 preferably operates as an IMAX target and thus couples to IMAX target busses 175 and 225. The timer 180 preferably comprises a programmable interval timer, implemented as an INTEL device #8254. Preferably, the timer 180 provides three counter output signals, identified as Counter 0, and Counter 2. The Counter 0 output signal provides a system timer interrupt for time-of-day, floppy time-out, and other system functions. The Counter 0 output of timer 180 connects to IRQ[0] of the interrupt controller 170. Counter 2 generates a tone for system speakers.

Referring again to FIG. 4, each of the internal IMAX targets provides output data for read cycles on an outbound data bus. The outbound data bus from each target preferably connects to a multiplexer 173. One of these outbound data busses from the IMAX targets is selected based upon the value of the chip selects signal asserted by the address decoder 190. The selected outbound data values are then coupled via the outbound data bus to the PCI target interface 185.

According to the preferred embodiment, the target IMAX bus 175 comprises a high speed, 32-bit, internal ASIC bus. The target IMAX bus functions as the primary means of communication between internal target devices 135, 145, 180 (for example) and the internal expansion bus target interface 185. By standardizing on a particular internal bus protocol for the South bridge, much of the South bridge ASIC may be re-used in future design efforts. In addition, the manufacturers of peripheral devices can design devices compatible with the IMAX protocol to insure that their designs will remain compatible with future generations of the South bridge logic. Furthermore, the design of an internal target (such as the IDE IMAX target 155 or USB target 135) is not tied to a specific expansion bus like PCI. Since a common bus target interface is used to couple other devices to the expansion bus, only the bus target interface 185 needs to be modified if the expansion bus protocol is changed or modified. The target IMAX bus 175 preferably is not tri-stated and is always driven.

Now that the PCI interfaces and targets and masters have been discussed, the various signals used on the IMAX target bus 175 will be described in tabular form with general reference to FIG. 4. Each of these signals is described from the perspective of the IMAX target.

TABLE I

System Signals

| SIGNAL | I/O | DESCRIPTION |
|---|---|---|
| CLK | I | The clock signal provides the timing for all the transactions on the IMAX bus. The same clock signal must be used for both the IMAX target and the IMAX target interface. |
| RST_ | I | The reset is used in both interfaces to reset IMAX specific registers and signals. |

Figure 8:
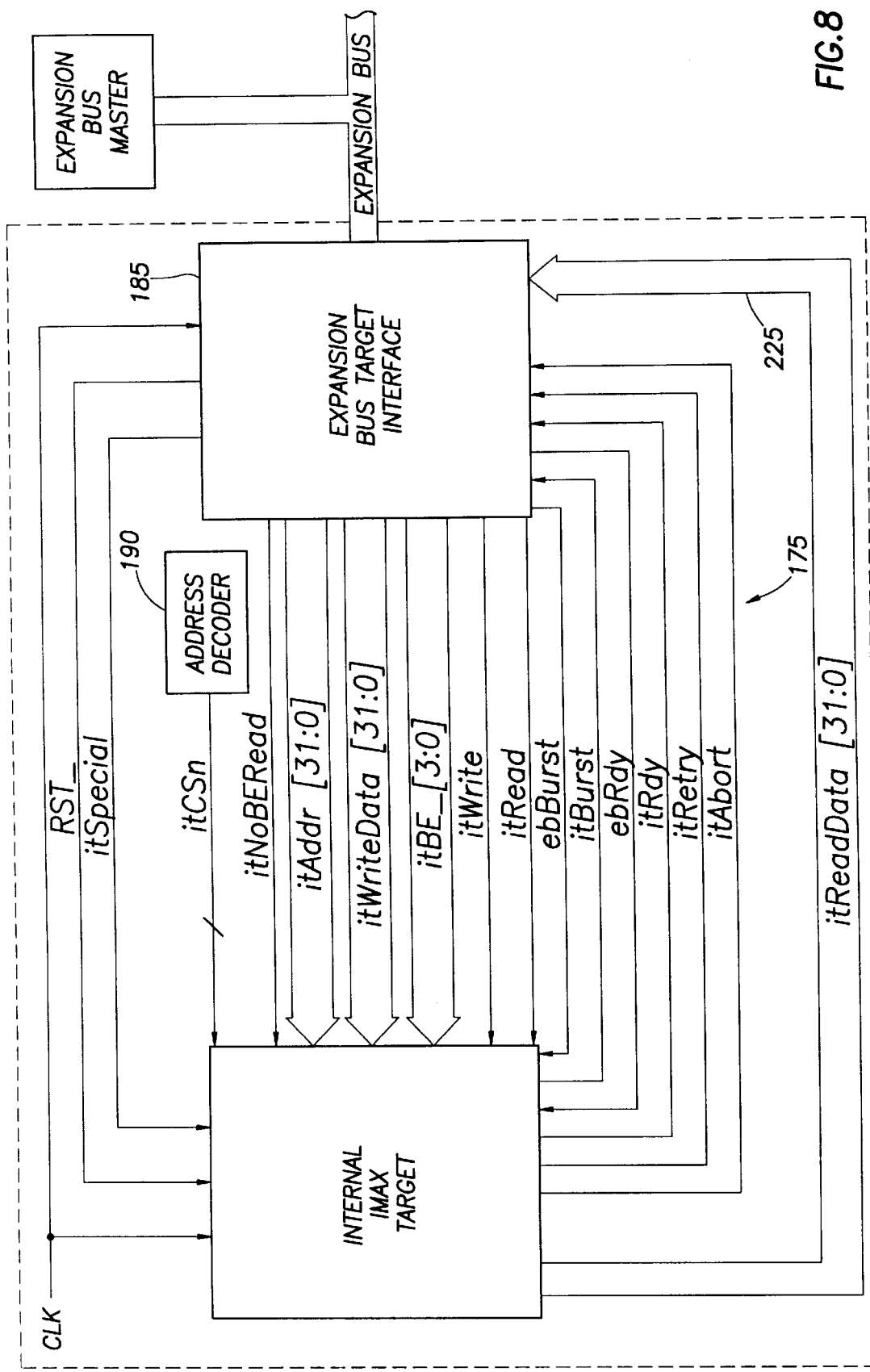
FIG. 8 is a block diagram illustrating the signal lines comprising the IMAX target bus of FIG. 4.

Referring now to FIG. 8, the clock (CLK) input signal comprises the IMAX bus clock. All IMAX internal targets drive their output signals and latch their input signals on the rising edge of the CLK signal. When asserted, the RST-input signal resets all IMAX targets to known states and is used to reset configuration registers. The address and data signals on the IMAX target bus include the following signals described in Table II, from the perspective of the target.

TABLE II

Address and Data Signals

| SIGNAL | I/O | DESCRIPTION |
|---|---|---|
| itAddr[31:0] | I | Target address. This indicates the address of the target cycle. Targets only need to use the necessary address bits for proper decode in cooperation with the chip selects. |
| itBE_[3:0] | I | Target byte enables. Indicates valid byte lanes for the transfer. |
| ItWriteData[31:0] | I | Target write data. Represents the data to be written to the target on the inbound target bus 175. |
| ItReadData[31:0] | O | Target read data. Represents the data read from the target on the outbound data bus 225. |

Referring still to FIG. 8, the itAddr input signals comprise a 32 bit address transmitted on the target address lines for the cycle. These address signals represent the address of the current cycle during the entire IMAX cycle and preferably are valid on the rising edges of CLK during a cycle. The itBE_ control input signals are used to determine which bytes of data should be transferred if the data transfer is less than 4 bytes wide. Byte zero corresponds to itBE_[0], byte one corresponds to itBE_[1] and so on. These signals preferably are valid on the rising edges of CLK during a cycle. The itWriteData input signals represent the data to be written on the incoming data lines when the cycle is a write cycle. Up to 4 bytes of data can be transferred per clock. Data preferably is valid on the rising edge of CLK during a write cycle. The itReadData output signals are driven by the IMAX internal target on the outbound data bus 225 and include the read data being provided by the target. Up to 4 bytes of data can be transferred per clock and the data preferably is driven off of the rising edge of CLK. After the target indicates that the read data is valid, the targets preferably hold this data valid until the end of the IMAX cycle. In the case of burst transactions, the read data is held valid until the expansion bus target interface indicates that it has captured the read data.

The interface control signals between the PCI target interface 185 (and address decoder 190) and the internal South bridge targets now will be described from the perspective of the targets.

TABLE III

Interface Control Signals

| SIGNAL | I/O | DESCRIPTION |
| --- | --- | --- |
| ItCSn | I | Chip select(s). There is a unique chip select per target or address range within a target, i.e. a single target can have multiple chip selects. Indicates the cycle is to the selected target or address range within a target. |
| ItWrite | I | Write cycle. When asserted the present cycle is a write cycle. |
| ItRead | I | Read cycle. When asserted the present cycle is a read cycle. |
| ItNoBERead | I | No Byte Enables Read cycle. Asserted one clock earlier than itRead, when the byte enables are not available. Used for zero-wait state reads and burst reads. |
| ItSpecial | I | Special cycle. (Optional) Assertion indicates the expansion bus interface is re-broadcasting a special cycle on the IMAX bus. |
| EbBurst | I | Expansion bus burst. (Optional) Assertion indicates that the current cycle is a burst cycle. |
| ItBurst | O | IMAX target burst. (Optional) Assertion indicates the selected target is capable of running a burst cycle to/from the current cycle address. |
| EbRdy | I | Expansion bus interface ready. Indicates the expansion bus interface has received data or is sending valid data on the IMAX bus. |
| ItRdy | O | IMAX target ready. (Optional for zero wait state targets) Indicates the target is sending valid data or can accept data when asserted. |
| ItRetry | O | IMAX target retry. (Optional) Assertion indicates the target can not process the current cycle and the cycle should be retried. Also, used to support delayed transfers. |
| ItAbort | O | IMAX target abort. (Optional) Assertion indicates the target has encountered a fatal error or can never process the current cycle and it should be aborted. |

Referring to FIG. 8, the itCSn input signal represents the various itCS chip select signals generated by the address decoder 190 to the internal IMAX targets. This signal is used by IMAX targets to qualify the IMAX control signals. The IMAX control, address and data signals will only be valid for a specific target when the target is activated by receipt of its itCS signal. The itCS signal preferably is valid on the rising edge of the CLK signal during a cycle. In the preferred embodiment, a particular target may have its itCS signal asserted and that signal may stay asserted indefinitely. Each target preferably is assigned a unique chip select value determined by address range and/or function. Moreover, an individual target may receive more than one chip select value. For example, a target may receive a chip select value for configuration cycles, another for I/O accesses to an address range that can operate as a zero-wait-state target, another value for an I/O address range that can not operate as a zero-wait-state target, and yet another chip select value for a specific address range of memory. The number of chip selects per target and the functionality encoded on each is up to the IMAX target designer.

The itWrite input signal signifies the start of an IMAX write cycle to an internal target. This signal, when asserted, signifies the itBE_ signals are valid and that the expansion bus target interface 185 is providing valid data on the itWriteData signals for the first data transfer. For subsequent data transfers in the case of bursting, the IMAX targets monitor ebRdy. Once asserted, the itWrite signal remains asserted until the end of the IMAX cycle. The itWrite signal preferably is deasserted between consecutive cycles. Therefore, targets preferably use the assertion and deassertion of the itWrite signal to mark the beginning and end of IMAX write cycles. The itWrite signal preferably is valid on the rising edge of the CLK signal during an IMAX cycle.

The itRead input signal preferably signifies the start of an IMAX read cycle. This signal, when asserted, signifies that the itBE_ signals are valid and that the expansion bus interface is ready to receive the first piece of data. For subsequent data in a burst cycle, targets preferably monitor ebRdy. Once asserted, the itRead signal remains asserted until the end of the IMAX cycle. The itRead signal preferably is deasserted between consecutive cycles. Therefore, targets preferably use the assertion and deassertion of the itRead signal to mark the beginning and end of IMAX read cycles. The itRead signal preferably is valid on the rising edge of the CLK signal during an IMAX cycle.

The itNoBERead input signal defines a special case for the itRead signal. Typically targets will not use both itNoBERead and itRead. The itNoBERead signal preferably is asserted earlier than the itRead signal, before the expansion bus interface 185 provides valid values on itBE_. The itNoBERead signal is for targets that can provide data in zero-wait-states and that do not need byte enable information to perform the operation. In the preferred embodiment, the itNoBERead signal is primarily used as a gating signal for itReadData output signals. When asserted, itNoBERead marks the beginning of an IMAX read cycle and indicates the expansion bus interface 185 is ready to receive the first piece of data. For subsequent pieces of data in the case of bursting, targets must monitor the ebRdy signal. Once sampled, itNoBERead preferably is not deasserted until the end of the IMAX cycle. The itNoBERead signal preferably is always deasserted between consecutive cycles. Therefore, targets can use the sampled assertion and sampled deassertion of the itNoBERead signal to mark the beginning and end of IMAX read cycles. The itNoBERead signal preferably is not synchronously driven, but does meet setup and hold requirements. Since this is an asynchronous signal, targets using it must not perform destructive reads with it until they observe the end of the data transfer with ebRdy and itRdy asserted.

The itSpecial input signal is used to broadcast on the IMAX bus 175 a special cycle that is being run on the expansion bus 55. Once asserted, itSpecial preferably stays asserted until the end of the special expansion bus cycle. Assertion and deassertion of the itSpecial signal marks the beginning and end of the cycle on the IMAX target bus. During the assertion of itSpecial, the itAddr signal represents the address of the special expansion bus cycle. Also, the itBE_ signal and itWriteData signal contain the byte enables and the current data being driven by the special cycle master.

The input signal, ebBurst, indicates to the IMAX internal targets that the expansion bus wants to perform a burst transfer. Its assertion has no timing relationship to the signals itWrite, itRead, or itNoBERead, but preferably ebBurst is asserted before the first data transfer completes if the expansion bus wants to burst. Once asserted, ebBurst remains asserted until the end of the cycle, and then gets deasserted with either itWrite, itRead, or itNoBERead.

The target output signal, itBurst, indicates to the expansion bus target interface 185 that the target is capable of performing a burst transfer on this cycle. This signal preferably is asserted by the target when initially asserting the itRdy signal. Once a target asserts this signal it must keep it asserted until the end of the cycle, which is marked by the deassertion of itWrite, itRead, or itNoBERead.

The input signal, ebRdy, is the expansion bus interface ready indicator. The assertion of ebRdy has no timing relationship to the signals itWrite, itRead, or itNoBERead. Sampling ebRdy and itRdy active for the first time during the IMAX cycle indicates the first data transfer occurred. Preferably, targets only increment counters or change itReadData if a burst transaction is agreed upon by both target and expansion bus interface, as indicated by the assertion of both itBurst and ebBurst. In the case of IMAX reads on the first data transfer, ebRdy gets asserted when the expansion bus interface is ready to receive data. The signal ebRdy is used most often when bursting. In the case of burst transfers, that is when both itBurst and ebBurst are active, ebRdy signifies the expansion bus interface is able to accept the next read data or it is providing the next write data valid on the itWriteData signals during read and write cycles respectively. The expansion bus interface is capable of inserting wait states after the first data transfer by deasserting and asserting ebRdy while bursting. When doing a burst read from a target it is the responsibility of the target to hold the data valid on itReadData when it sees the expansion bus interface inserting wait states by deasserting ebRdy. In the case of burst writes, data is not valid on the itWriteData signals when ebRdy is deasserted.

The output signal, itRdy, is driven off the rising edge of CLK. The itRdy signal is asserted by the target to indicate when the target is driving valid data on the itReadData signals or, alternatively, that it is able to perform a write transaction. During single reads, targets hold itRdy asserted once they assert it and hold itReadData stable and constant while they are asserting itRdy until they observe the end of the cycle with the deassertion of itRead or itNoBERead. During burst reads, targets can change the itReadData to the next data transfer upon sampling itRdy and ebRdy active on the same clock. Targets can also insert wait states by deasserting the itRdy signal, indicating valid data is not present in the itReadData signals. Targets must provide data at a minimum of every eight clocks when being read to meet PCI latency requirements. During single write cycles, targets preferably also hold itRdy asserted once they assert it until they observe the end of the cycle with the deassertion of itWrite. When performing a burst write, targets can increment pointers upon sampling itRdy and ebRdy active on the same clock. Targets can insert wait states by deasserting itRdy, but they should be capable of accepting up to two more data transfers.

The itRetry output signal is asserted by the target to postpone a transaction either because the target needs to run it as a delayed transaction, or because the target cannot process the transaction at the current time. The target can assert this signal at anytime to totally refuse a cycle if it hasn't started a burst cycle. Targets still follow itRdy and ebRdy protocol with respect to providing and taking valid data when retrying cycles. Once a target asserts itRetry it cannot deassert it until the end of the cycle is indicated by the deassertion of itWrite, itRead, or itNoBERead.

The itAbort output signal is used by the target to indicate fatal errors. This signal can be asserted at anytime to abort a cycle. Once a target asserts itAbort it can not deassert it until the end of the cycle is seen with the deassertion of itWrite, itRead, or itNoBERead.

A target IMAX cycle begins with the assertion of itWrite, ItRead, or itNoBERead along with itCS. When the IMAX target has completely decoded the cycle and is ready to begin transferring data, the target asserts a ready signal to start the data transfer. Data is transferred during read cycles with both the expansion bus interface and the IMAX target asserting ready signals. In the case of write cycles, data is transferred using just the ready signal from the IMAX target interface. Either the IMAX target or expansion target may insert wait states with the deassertion of their ready signal. On burst write cycles, however, the target must be able to accept up to two more data transfers after deasserting its ready signal.

Figure 5A:
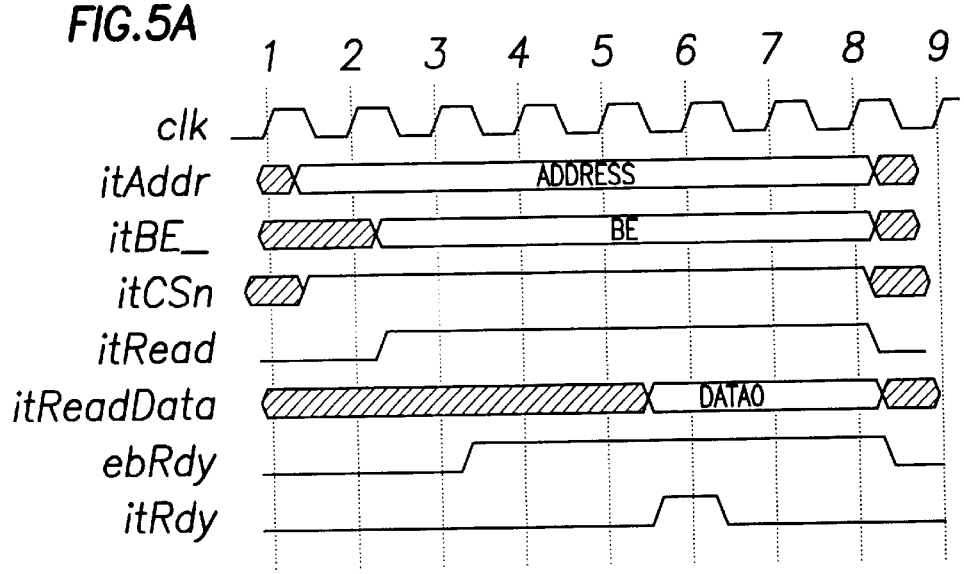
FIGS. 5A, 5B and 5C are timing diagrams illustrating read transactions on the IMAX target bus depicted in FIG. 4.

Referring now to FIGS. 5A and 8, an IMAX target read starts with an address phase which occurs when the target's chip select itCSn is asserted. During the address phase itAddr is valid. One clock later itRead, ebBurst, and itBE__ become valid. The itBE__ signals are valid coincident with the assertion of itRead so that an IMAX target needing byte enables knows when they are valid.

Figure 5B:
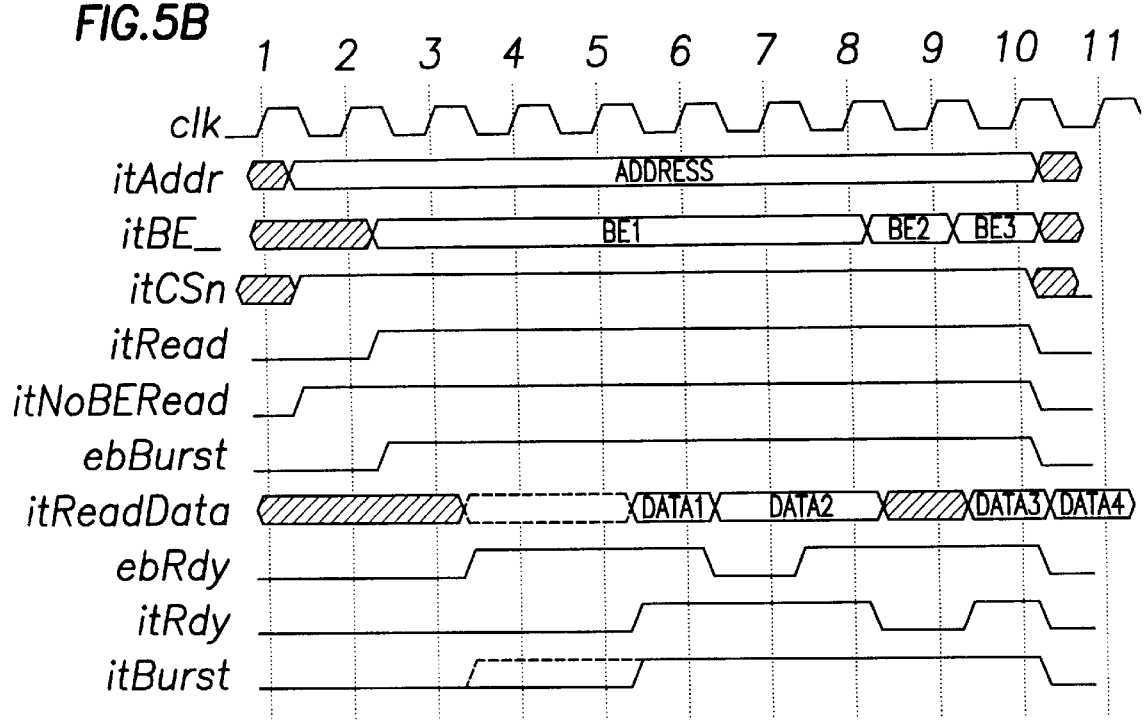

Clock 3 is the earliest point the data phase can start. At this point the IMAX interface will assert ebRdy to the target indicating it is ready to accept data. During the data phase, itBE__ show which byte lanes are valid in the current data phase. When the target drives data on itReadData it will assert itRdy indicating the read data is valid or it can insert wait states by deasserting itRdy. Also, the IMAX interface may insert wait states by deasserting ebRdy. Targets capable of bursting at least 2 more double words of read data from the current cycle address will also assert itBurst when asserting itRdy. A target performing a burst cycle with wait states can be seen in FIG. 5B. Data is transferred on clocks 6, 8, and 10.

Figure 5C:
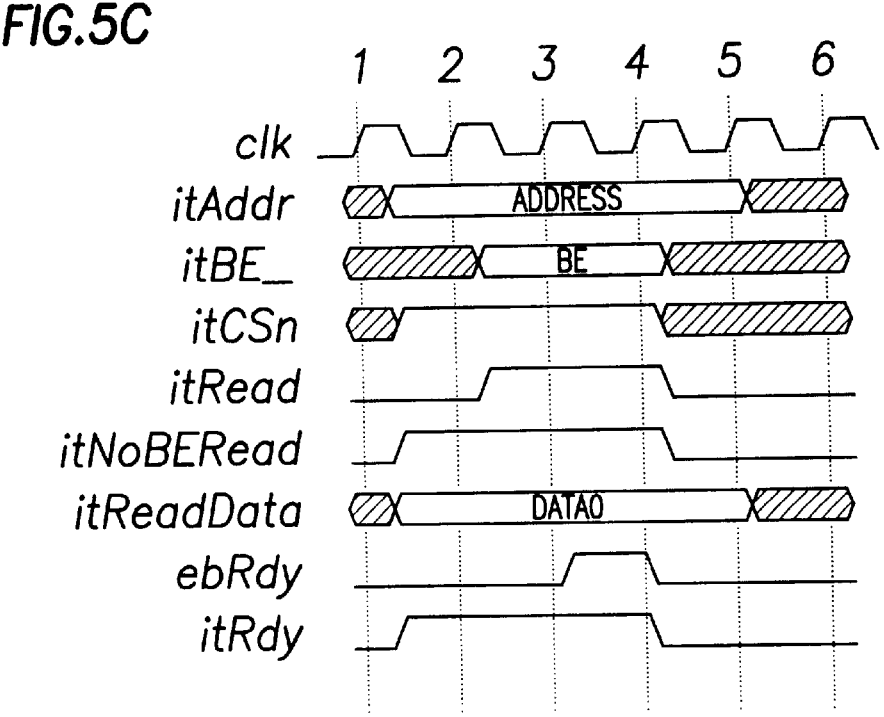
Figure 7:
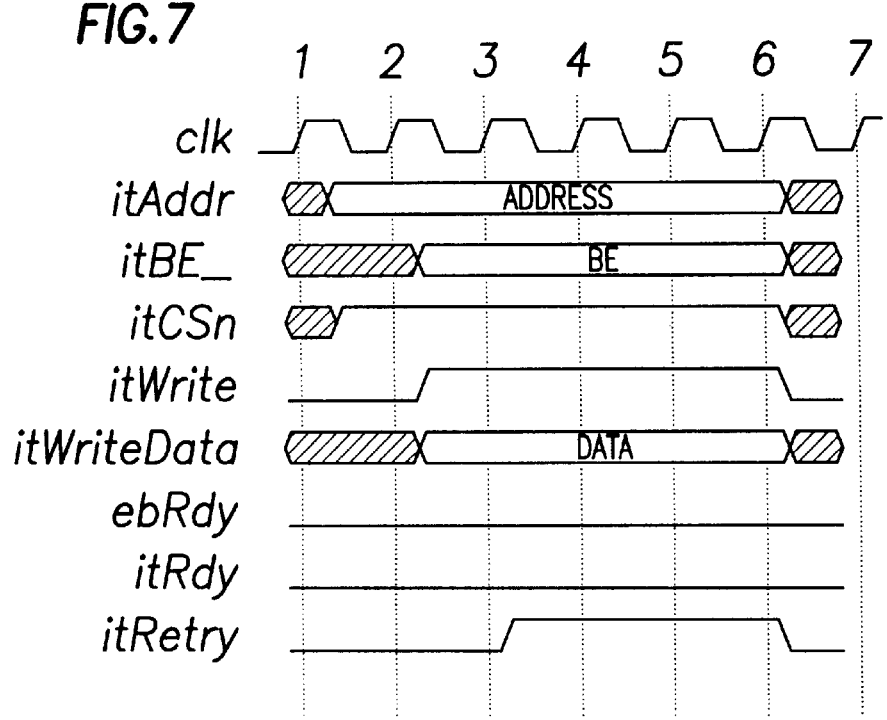
FIG. 7 is a timing diagram illustrating a retry cycle for an IMAX target.

Referring now to FIG. 5C, in the case of zero-wait state reads there is an additional signal used, itNoBERead. The itNoBERead signal comes out one clock earlier than the normal read signal and is valid with the assertion of the target's chip select. It indicates the IMAX interface is ready to accept zero-wait state read data from the selected target. A zero-wait state target will continuously assert itRdy indicating it is always ready to supply data. Hence, it is able to supply its data one clock earlier than a non-zero-wait state target. The target stops the cycle with the deassertion of itRead or itNoBERead.

Figure 6A:
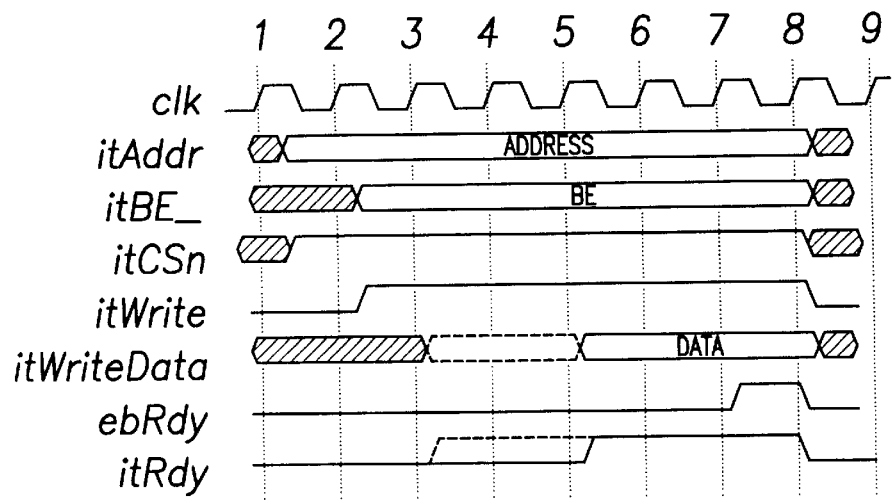
FIGS. 6A and 6B are timing diagrams illustrating write transactions on the IMAX target bus depicted in FIG. 4.
Figure 6B:
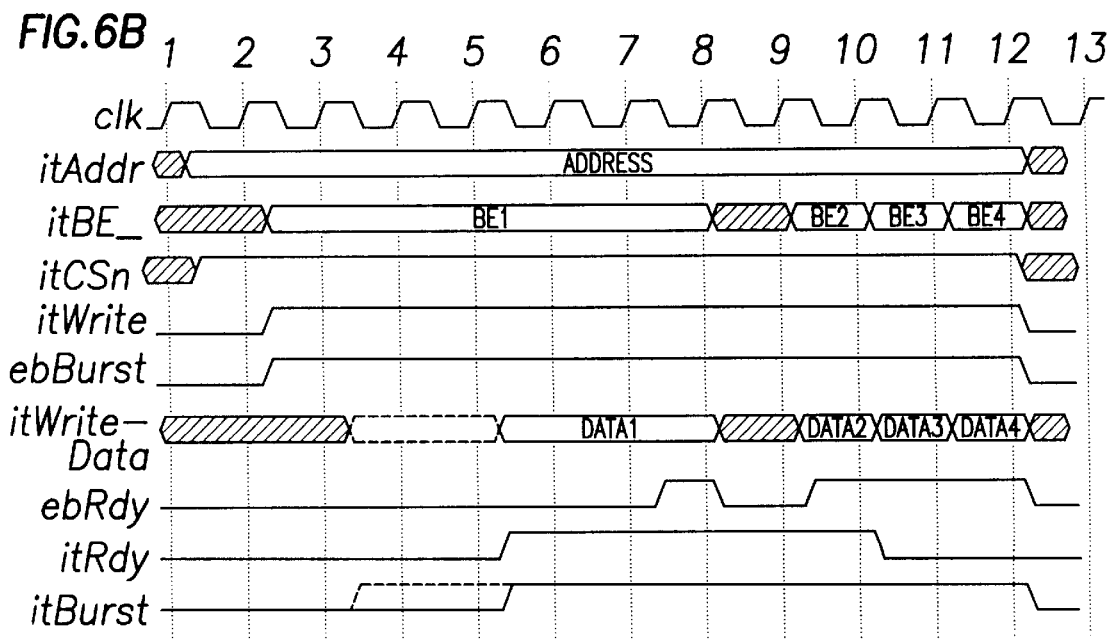

FIGS. 6A, 6B and 6C illustrate write cycles. Referring first to FIG. 6A, the first phase of the transaction is the address phase and starts with the assertion of the chip select signal, itCSn, to the target. During the address phase the itAddr signal is valid along with other control signals. When data is ready from the expansion bus, itWrite is asserted and ebBurst, and itBE__ are valid. The itBE__ signals are valid coincident with the assertion of itWrite so that an IMAX target needing byte enables knows when they are valid.

After decoding the cycle information, the target asserts itRdy indicating it is ready to accept write data in the next clock. A target that is capable of bursting to the current address will also assert itBurst at the same time it asserts itRdy. In the case of zero-wait state targets, itRdy is continuously asserted indicating it is always ready to receive write data. The IMAX interface indicates to the target that valid write data is on itWriteData by asserting ebRdy or it can insert wait states by deasserting ebRdy. As shown in FIG. 6B, an IMAX target capable of bursting can insert wait states by deasserting itRdy, but the target must be able to accept up to 2 more data transfers after deasserting itRdy. Data is transferred on clocks 8, 10, 11, and 12. A write cycle is completed with the deassertion of itWrite.

IMAX targets are capable of prematurely ending cycles with either of two signals, itRetry and itAbort. The itRetry signal can be asserted any time after the address phase to retry an entire cycle or a portion of a cycle. If itRetry is asserted along with itRdy the current data is still transferred. Zero-wait state devices can not use itRetry. FIG. 6C illustrates an IMAX retry cycle. The itAbort signal indicates an abnormal termination due to an IMAX target detecting a fatal error or it never being able to complete the cycle.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

We claim:

1. A computer system, comprising:
a CPU;
a main memory;
at least one peripheral device coupled to said CPU by an expansion bus;
a bridge logic device connected to said expansion bus, and wherein said bridge logic includes:
a plurality of target devices;
a common expansion bus target interface coupled to said expansion bus and to said plurality of target devices for translating expansion bus cycles to a protocol compatible with the plurality of target devices; and
an address decoder coupled to said target interface for selecting which target device receives the translated cycles.

2. A computer system as in claim 1, wherein at least one of said plurality of target devices couples to a secondary expansion bus.

3. A computer system as in claim 2, wherein said expansion bus comprises a PCI bus, and said secondary expansion bus comprises an ISA bus.

4. A computer system as in claim 3, wherein at least one of said target devices comprises an ISA controller residing in the bridge logic device.

5. A computer system as in claim 1, wherein said bridge logic includes an internal modular target expansion bus coupling said plurality of target devices to said expansion bus target interface.

6. A computer system as in claim 5, wherein said expansion bus comprises a PCI bus and said expansion bus target interface comprises a PCI target interface for translating PCI cycles to internal modular expansion bus cycles.

7. A computer system as in claim 6, wherein said bridge logic device comprises a South bridge coupling the PCI bus to one or more secondary expansion busses.

8. A computer system as in claim 7, further comprising a North bridge logic coupling said CPU and said main memory to the PCI bus.

9. A computer system as in claim 5, wherein said bridge logic further includes:

an expansion bus master interface coupled to said expansion bus; and
an internal modular master expansion bus coupling said plurality of target devices to said expansion bus master interface.

10. A computer system comprising:
a CPU;
a main memory;
at least one peripheral device coupled to said CPU by an expansion bus;
a bridge logic device connected to said expansion bus, and wherein said bridge logic includes:
a plurality of target devices; and
a common expansion bus target interface coupled to said expansion bus and to said plurality of target devices for translating expansion bus cycles to a protocol compatible with the plurality of target devices,
wherein at least one of said plurality of target devices couples to a secondary expansion bus, and
wherein said secondary expansion bus comprises an IDE bus, and at least one of said target devices comprises an IDE controller integrated in the bridge logic device.

11. A computer system comprising:
a CPU;
a main memory;
at least one peripheral device coupled to said CPU by an expansion bus;
a bridge logic device connected to said expansion bus, and wherein said bridge logic includes:
a plurality of target devices; and
a common expansion bus target interface coupled to said expansion bus and to said plurality of target devices for translating expansion bus cycles to a protocol compatible with the plurality of target devices,
wherein at least one of said plurality of target devices couples to a secondary expansion bus, and
wherein said secondary expansion bus comprises a USB bus, and at least one of said target devices comprises a USB controller integrated in the bridge logic device.

12. A computer system comprising:
a CPU;
a main memory;
at least one peripheral device coupled to said CPU by an expansion bus;
a bridge logic device connected to said expansion bus, and wherein said bridge logic includes:
a plurality of target devices; and
a common expansion bus target interface coupled to said expansion bus and to said plurality of target devices for translating expansion bus cycles to a protocol compatible with the plurality of target devices,
wherein at least one of said plurality of target devices couples to a secondary expansion bus, and
wherein said plurality of target devices includes a distributed DMA controller and a re-map engine for completing cycles on said expansion bus addressed to legacy DMA channels.

13. A computer system, comprising:
a CPU;
a main memory;

a bridge logic device coupled to said CPU and said main memory by an expansion bus, said bridge logic coupling external peripheral devices to said expansion bus for running cycles on said expansion bus to said external peripheral devices, wherein said bridge logic includes:
 a plurality of target devices;
 a common internal modular target expansion bus coupling said plurality of target devices to said expansion bus;
 an expansion bus target interface coupled to said expansion bus and to said common internal modular expansion bus, said expansion bus target interface detecting and translating expansion bus cycles on behalf of said target devices; and
 an address decoder coupled to said target interface for selecting which target device receives the translated cycles.

14. A computer system as in claim 13, wherein said expansion bus comprises a PCI bus, and said expansion bus target interface comprises a PCI bus target interface translating PCI cycles on behalf of said target devices.

15. A computer system as in claim 14, wherein said bridge logic device comprises a South bridge coupling the PCI bus to one or more secondary expansion busses.

16. A computer system as in claim 15, wherein said secondary expansion bus comprises an ISA bus, and one of said plurality of target devices comprises an ISA controller.

17. A computer system as in claim 13 wherein said bridge logic further includes:
 an expansion bus master interface coupled to said expansion bus; and
 an internal modular master expansion bus coupling said plurality of target devices to said expansion bus master interface.

18. A computer comprising:
 a CPU;
 a main memory;
 a bridge logic device coupled to said CPU and said main memory by an expansion bus, said bridge logic coupling external peripheral devices to said expansion bus for running cycles on said expansion bus to said external peripheral devices, wherein said bridge logic includes:
  a plurality of target devices;
  a common internal modular target expansion bus coupling said plurality of target devices to said expansion bus;
  an expansion bus target interface coupled to said expansion bus and to said common internal modular expansion bus, said expansion bus target interface detecting and translating expansion bus cycles on behalf of said target devices,
  wherein said expansion bus comprises a PCI bus, and said expansion bus target interface comprises a PCI bus target interface translating PCI cycles on behalf of said target devices,
 wherein said bridge logic device comprises a South bridge coupling the PCI bus to one or more secondary expansion busses, and
 wherein at least one of said secondary expansion busses comprises a USB bus, and at least one of said plurality of target devices comprises a USB controller.

19. A computer comprising:
 a CPU;
 a main memory;
 a bridge logic device coupled to said CPU and said main memory by an expansion bus, said bridge logic coupling external peripheral devices to said expansion bus for running cycles on said expansion bus to said external peripheral devices, wherein said bridge logic includes:
  a plurality of target devices;
  a common internal modular target expansion bus coupling said plurality of target devices to said expansion bus;
  an expansion bus target interface coupled to said expansion bus and to said common internal modular expansion bus, said expansion bus target interface detecting and translating expansion bus cycles on behalf of said target devices,
  wherein said expansion bus comprises a PCI bus, and said expansion bus target interface comprises a PCI bus target interface translating PCI cycles on behalf of said target devices,
 wherein said bridge logic device comprises a South bridge coupling the PCI bus to one or more secondary expansion busses, and
 wherein at least one of said secondary expansion busses comprises an IDE bus, and at least one of said plurality of target devices comprises an IDE controller.

20. A computer system, comprising:
 a CPU;
 a main memory;
 a North bridge logic device coupling a primary expansion bus to said CPU and said main memory;
 a South bridge logic device connected to said primary expansion bus, said South bridge logic coupling at least one secondary expansion bus to said primary expansion bus for running cycles originating from devices on the primary expansion bus to said secondary expansion bus;
 wherein said South bridge logic includes:
  an interface control device for each secondary expansion bus;
  a common expansion bus target interface coupled to said primary expansion bus and to each control device for monitoring and translating expansion bus cycles on behalf of said interface control devices;
  an internal modular target expansion bus coupled to said interface control devices and to said common expansion bus target interface for transferring translated expansion bus cycles to the interface control devices; and
  an address decoder coupled to said target interface for selecting which interface control device receives the translated cycles.

21. A computer system as in claim 20, wherein said primary expansion bus comprises a PCI bus, and said expansion bus target interface comprises a PCI target interface that translates PCI cycles to cycles consistent with the protocol of said internal modular target expansion bus.

22. A computer system as in claim 20, wherein said at least one secondary expansion bus comprises one or more of the following busses: an ISA bus; a USB bus; or an IDE bus.

23. A computer system as in claim 20, wherein said control device includes one or more of the following: a re-map engine; a floppy snoop logic; a distributed DMA controller; a USB controller; an ISA controller; or an IDE controller.

24. A computer system comprising:
 a CPU;

a main memory;

a North bridge logic device coupling a primary expansion bus to said CPU and said main memory;

a South bridge logic device connected to said primary expansion bus, said South bridge logic coupling at least one secondary expansion bus to said primary expansion bus for running cycles originating from devices on the primary expansion bus to said secondary expansion bus;

wherein said South bridge logic includes:

an interface control device for each secondary expansion bus;

a common expansion bus target interface coupled to said primary expansion bus and to each control device for monitoring and translating expansion bus cycles on behalf of said control devices; and an internal modular target expansion bus coupled to said control device and to said common expansion bus target interface for transferring translated expansion bus cycles to the control devices, wherein said control devices include a distributed DMA controller and a re-map engine for completing cycles on said secondary expansion bus addressed to legacy DMA channels.

25. A computer system, comprising:

a CPU;

a main memory;

a bridge logic device coupled to said CPU and said main memory by a primary expansion bus, said bridge logic coupling external peripheral devices to said primary expansion bus for running cycles on said primary expansion bus to said external peripheral devices;

wherein said bridge logic includes:

a plurality of target devices;

a common internal modular target expansion bus coupling said plurality of target devices to said primary expansion bus;

an expansion bus target interface coupled to said primary expansion bus and to said common internal modular target expansion bus, said expansion bus target interface detecting and translating primary expansion bus cycles on behalf of said target devices;

a plurality of master devices;

a common internal modular master expansion bus coupling said plurality of master devices to said primary expansion bus;

an expansion bus master interface coupled to said primary expansion bus and to said common internal modular master expansion bus, said expansion bus master interface detecting and translating primary expansion bus cycles on behalf of said master devices; and an address decoder coupled to said target interface for selecting which target device receives the translated cycles.

26. A computer system as in claim 25, wherein said expansion bus comprises a PCI bus, and said expansion bus master interface comprises a PCI master interface that translates master cycles on said internal modular master expansion bus to PCI master cycles.

27. A computer system as in claim 25, wherein said expansion bus comprises a PCI bus, and said expansion bus target interface comprises a PCI target interface that translates cycles on said PCI bus to internal modular target expansion bus cycles.

28. A computer system comprising:

a CPU;

a main memory;

a bridge logic device coupled to said CPU and said main memory by a primary expansion bus, said bridge logic coupling external peripheral devices to said primary expansion bus for running cycles on said primary expansion bus to said external peripheral devices, wherein said bridge logic includes:

a plurality of target devices;

a common internal modular target expansion bus coupling said plurality of target devices to said primary expansion bus;

an expansion bus target interface coupled to said primary expansion bus and to said common internal modular target expansion bus, said expansion bus target interface detecting and translating primary expansion bus cycles on behalf of said target devices;

a plurality of master devices;

a common internal modular master expansion bus coupling said plurality of master devices to said primary expansion bus; and an expansion bus master interface coupled to said primary expansion bus and to said common internal modular master expansion bus, said expansion bus master interface detecting and translating primary expansion bus master cycles on behalf of said master devices, wherein said plurality of master devices also comprise at least some of said plurality of target devices.

29. A computer system as in claim 28, wherein said master devices include one or more of the following: a re-map engine; a floppy snoop logic; a distributed DMA controller; a USB controller; an ISA controller; or an IDE controller.

30. A bridge logic device, comprising:

a plurality of target devices;

a target interface coupled to said plurality of target devices through an internal modular target bus, wherein said target interface is capable of receiving signals from devices external to said bridge logic and translating said signals to a protocol compatible with said plurality of target devices, wherein said target interface is capable of connecting to an external expansion bus that implements a protocol different than the internal modular target bus protocol, and wherein said target interface converts master cycles on said external expansion bus to cycles compatible with the internal modular target bus protocol; and an address decoder coupled to said target interface for selecting which target device receives the converted cycles.

31. A bridge logic as in claim 30, wherein said target devices and said internal modular target bus implement a common protocol.

32. A bridge logic as in claim 31, wherein said external expansion bus comprises a PCI bus.

33. A bridge logic as in claim 31, wherein at least one of said plurality of target devices couple to a secondary expansion bus.

34. A bridge logic as in claim 33, wherein said secondary expansion bus comprises an ISA bus.

35. A bridge logic as in claim 33, wherein the selected target device converts the cycle on the internal modular target bus to a protocol compatible with the secondary expansion bus.

36. A bridge logic device comprising:

a plurality of target devices;

a target interface coupled to said plurality of target devices through an internal modular target bus, wherein said target interface is capable of receiving signals from devices external to said bridge logic and translating said signals to a protocol compatible with said plurality of target devices, wherein said target interface is capable of connecting to an external expansion bus that implements a protocol different than the internal modular target bus protocol, and wherein said external expansion bus comprises a PCI bus;

wherein at least one of said plurality of target devices couple to a secondary expansion bus, and wherein said secondary expansion bus comprises a USB bus.

37. A bridge logic device comprising:

a plurality of target devices;

a target interface coupled to said plurality of target devices through an internal modular target bus, wherein said target interface is capable of receiving signals from devices external to said bridge logic and translating said signals to a protocol compatible with said plurality of target devices, wherein said target interface is capable of connecting to an external expansion bus that implements a protocol different than the internal modular target bus protocol, and wherein said external expansion bus comprises a PCI bus;

wherein at least one of said plurality target devices couple to a secondary expansion bus, and wherein said secondary expansion bus comprises an IDE bus.

* * * * *